(12) United States Patent
Fan

(10) Patent No.: US 9,817,181 B2
(45) Date of Patent: Nov. 14, 2017

(54) LIQUID CRYSTAL DISPLAY AND BACKLIGHT MODULE THEREOF

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 51 days.

(21) Appl. No.: 14/784,270

(22) PCT Filed: Sep. 21, 2015

(86) PCT No.: PCT/CN2015/090127
§ 371 (c)(1),
(2) Date: Oct. 13, 2015

(87) PCT Pub. No.: WO2017/031801
PCT Pub. Date: Mar. 2, 2017

(65) Prior Publication Data
US 2017/0192164 A1    Jul. 6, 2017

(30) Foreign Application Priority Data

Aug. 21, 2015  (CN) .......................... 2015 1 0520834

(51) Int. Cl.
*F21V 7/04*       (2006.01)
*F21V 8/00*       (2006.01)
(Continued)

(52) U.S. Cl.
CPC ........... *G02B 6/0091* (2013.01); *G02B 6/005* (2013.01); *G02B 6/0051* (2013.01);
(Continued)

(58) Field of Classification Search
CPC .... G02B 6/0091; G02B 6/005; G02B 6/0051; G02B 6/0053; G02B 6/0026;
(Continued)

(56) References Cited

U.S. PATENT DOCUMENTS

2012/0257136 A1* 10/2012 Horiuchi .............. G02B 6/0085
                                                      362/613
2015/0192824 A1*  7/2015 Hirota .................. G02B 6/0088
                                                       349/58
(Continued)

*Primary Examiner* — Y M. Lee
(74) *Attorney, Agent, or Firm* — Andrew C. Cheng

(57) ABSTRACT

The present invention proposes a backlight module includes an LCD and a backlight module. A QD film adheres to a light guide plate. An optical film is arranged on the QD film. A light source is arranged at a lateral side of the light guide plate. A bezel accommodates the light guide plate and the light source. The bezel includes a base board and a sideboard extending along a direction perpendicular to the base board. The lateral frame encloses the bezel. The lateral frame includes a standing board and a horizontal extensive object. The standing board adheres to an outer side of the sideboard. The horizontal extensive object presses the QD film on the LGP and separates the optical film from the QD film, which prevents the edges of the QD film from getting distorted easily and having blue circles.

19 Claims, 5 Drawing Sheets

(51) Int. Cl.
*G09F 13/20* (2006.01)
*G02F 1/1335* (2006.01)

(52) U.S. Cl.
CPC .......... *G02B 6/0053* (2013.01); *G02B 6/0026* (2013.01); *G02F 1/133608* (2013.01); *G02F 1/133617* (2013.01); *G09F 13/20* (2013.01)

(58) Field of Classification Search
CPC . G02B 6/0088; G09F 13/20; G02F 1/133617; G02F 1/133608
See application file for complete search history.

(56) References Cited

U.S. PATENT DOCUMENTS

2016/0033715 A1* 2/2016 Lee et al. ............. G02B 6/0073 349/65
2016/0223739 A1* 8/2016 Yoon et al. ............ G02B 6/009

* cited by examiner

LIQUID CRYSTAL DISPLAY AND BACKLIGHT MODULE THEREOF

BACKGROUND OF THE INVENTION

1. Field of the Invention

The present invention relates to the field of liquid crystal displays (LCDs), and more particularly, to a backlight module and an LCD using the backlight module.

2. Description of the Prior Art

Quantum dots (QDs) are one kind of material for photoluminescence (PL) phosphor. The wavelength of QDs is moderated based on nanometer-size particles. QDs with different sizes make light with different bands. In addition, the full width at half maximum (FWHM) of QDs is usually only 20 nm to 50 nm, so the FWHM of QDs is small. The FWHM of QDs is very good as a high color saturation backlight. An LCD comprising a QD phosphor backlight has about 50% wider color range than an LCD comprising YAG ($Y_3Al_5O_{12}$) phosphor light emitting diode (LED) backlight so the LCD is brighter and more colorful. Also, the images are more stereoscopic.

However, QD phosphor is highly sensitive to water and oxygen so it tends to be ineffective. Moreover, fluorescence quenching for QD phosphor is extremely serious; that is, luminous efficacy declines seriously once temperature gets higher. At present, mostly QD phosphor is encapsulated with glass or with water-resistant and oxygen-resistant optical thin films. QD phosphor tightly adheres to the top of a light guide plate (LGP) for enhancing the excitement efficiency of QD phosphor.

To narrow the edge of bezels, the conventional design of narrow bezels adopts a film 2 arranged on a plastic frame (as FIG. 1 shows). However, a QD film 200 comprising no cutting mounting brackets (punching mounting brackets may destroy sealed edges, and water and vapor may pass through the edges) may move easily when being arranged on the plastic frame. Also, a QD blocking layer and a QD phosphor layer are separated because of the distorted QD film 200. Accordingly, the edges of the QD film 200 become blue faster or other technical problems.

SUMMARY OF THE INVENTION

An object of the present invention is to provide an LCD and a backlight module used in the LCD for resolving the problem that a QD film is distorted in the conventional technology. Due to the distorted QD film, a QD blocking layer and a QD phosphor layer get separated, which accelerates the edges of the QD film to become blue or other technical problems.

According to the present invention, a backlight module comprises a light guide plate (LGP), a quantum dot (QD) film, an optical film, a light source, a bezel, a lateral frame, and a support bar. The QD film adheres to the LGP. An optical film is arranged on the QD film. A light source is arranged at a lateral side of the LGP. The bezel accommodates the LGP and the light source. The bezel comprises a base board and a sideboard. The sideboard extends along a direction perpendicular to the base board. The lateral frame encloses the bezel. The lateral frame comprises a standing board and a horizontal extensive object. The standing board adheres to an outer side of the sideboard. The support bar is used for fixing the light source. An emitting plane of the LGP is as horizontal as a top of the support bar and a top of the sideboard for supporting the QD film. The horizontal extensive object comprises a first extension portion, a second extension portion, and a third extension portion. A bottom of the first extension portion joints the top of the sideboard. The second extension portion is arranged on the first extension portion. The second extension portion and the top of the sideboard form a slot for clipping lateral sides of the QD film based on a gap of the first extension portion. The third extension portion is arranged on the second extension portion. An extensive length of the third extension portion is smaller than an extensive length of the second extension portion for forming a shape of stairs and for supporting a lateral side of the optical film. The horizontal extensive object presses the QD film on the LGP and separates the optical film from the QD film.

Furthermore, the first extension portion comprises a holding face holding the top of the sideboard and a confronting face connected to the holding face for forming downward stairs.

Furthermore, the second extension portion comprises a pressing face, presses the QD film, and a supporting surface. The supporting surface supports the optical film, and being arranged with the pressing face with a certain distance for separating the QD film and the optical film. The top of the sideboard, the holding face, and the pressing face are connected successively for forming the slot for fixing the lateral sides of the QD film.

Furthermore, a plurality of second extension portions are used and disposed at intervals for holding the QD film discretely.

Furthermore, the horizontal extensive object further comprises a plurality of protrusions disposed on a bottom of the second extension portion at intervals for holding the QD film discretely.

Furthermore, the protrusion is a hemisphere-like or cone-like protrusion.

Furthermore, the protrusion adheres to the second extension portion.

Furthermore, the backlight module further comprises a sealed black glue coating ends of the QD film and arranged in the slot.

Furthermore, the bezel further comprises a support arranged on the base board for supporting the LGP.

Furthermore, the optical film comprises a diffusion sheet and a prism sheet layered successively.

According to the present invention, a backlight module comprises a light guide plate (LGP), a quantum dot (QD) film, an optical film, a light source, a bezel, and a lateral frame The QD film adheres to the LGP. An optical film is arranged on the QD film. A light source is arranged at a lateral side of the LGP. The bezel accommodates the LGP and the light source. The bezel comprises a base board and a sideboard. The sideboard extends along a direction perpendicular to the base board. The lateral frame encloses the bezel. The lateral frame comprises a standing board and a horizontal extensive object. The standing board adheres to an outer side of the sideboard. The horizontal extensive object presses the QD film on the LGP and separates the optical film from the QD film.

Furthermore, the horizontal extensive object comprises a first extension portion, a second extension portion, and a third extension portion. A bottom of the first extension portion joints the top of the sideboard. The second extension portion is arranged on the first extension portion. The second extension portion and the top of the sideboard form a slot for clipping lateral sides of the QD film based on a gap of the first extension portion. The third extension portion is arranged on the second extension portion. An extensive length of the third extension portion is smaller than an extensive length of the second extension portion for forming a shape of stairs and for supporting a lateral side of the optical film.

Furthermore, a plurality of second extension portions are used and disposed at intervals for holding the QD film discretely.

Furthermore, the horizontal extensive object further comprises a plurality of protrusions disposed on a bottom of the second extension portion at intervals for holding the QD film discretely.

Furthermore, the protrusion is a hemisphere-like or cone-like protrusion.

Furthermore, the protrusion adheres to the second extension portion.

Furthermore, the backlight module further comprises a sealed black glue coating ends of the QD film and arranged in the slot.

Furthermore, the bezel further comprises a support arranged on the base board for supporting the LGP.

Furthermore, the bezel further comprises a support bar, for fixing the light source. An emitting plane of the LGP is as horizontal as a top of the support bar and a top of the sideboard.

According to the present invention, a liquid crystal display comprises the backlight module as mentioned above.

Compared with the conventional technology, the benefit provided by the present invention is that the LCD device and the backlight module used in the LCD device are proposed by the present invention. The horizontal extensive object presses the QD film on the LGP and separates the optical film from the QD film, which prevents the edges of the QD film from getting distorted easily and having blue circles. In this way, the optical performance of the backlight of the QD film is improved, and the backlight module realizes narrow bezel.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
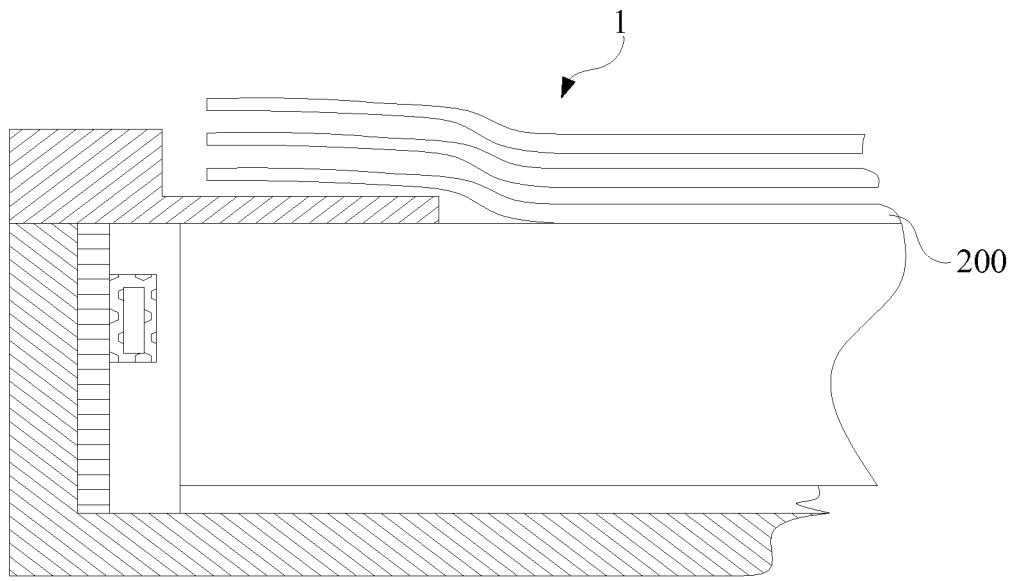
FIG. 1 shows a cross-sectional view of a conventional backlight module.
Figure 2:
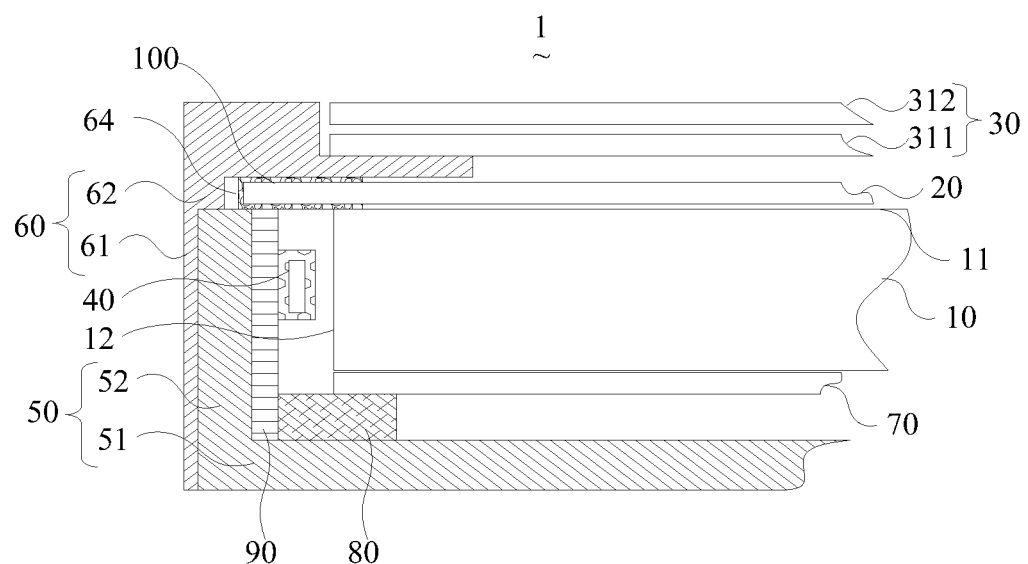
FIG. 2 is a schematic diagram of a cross section of a backlight module according to one embodiment of the present invention.

Please refer to FIG. 2. FIG. 2 is a schematic diagram of a cross section of a backlight module 1 according to one embodiment of the present invention. The backlight module 1 comprises an LGP 10, a QD film 20, an optical film 30, a light source 40, a bezel 50, and a lateral frame 60.

The QD film 20 adheres to the LGP 10 flat for absorbing the light emitted by the LGP 10 completely. The optical film 30 is arranged on the QD film 20. The optical film 30 comprises a diffusion sheet 311 and a prism sheet 312 layered successively in this embodiment. The light source 40 is arranged at a lateral side of the LGP 10. The bezel 50 accommodates the LGP 10 and the light source 40. The bezel 50 comprises a base board 51 and a sideboard 52. The sideboard 52 extends along a direction perpendicular to the base board 51. The lateral frame 60 encloses the bezel 50. The lateral frame 60 comprises a standing board 61 and a horizontal extensive object 62. The horizontal extensive object 62 extends along a direction of the standing board 61. The standing board 61 adheres to the outer side of the sideboard 52. The QD film 20 is pressed on the LGP 10 with the horizontal extensive object 62. The optical film 30 and the QD film 20 are separated with the horizontal extensive object 62.

Figure 3:
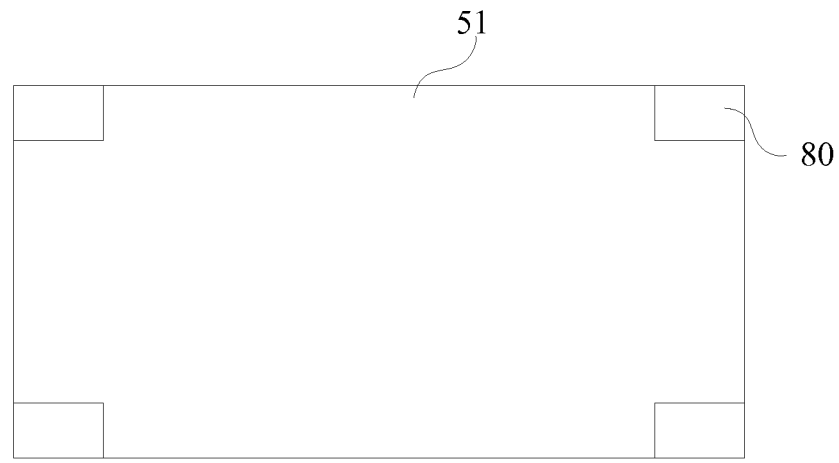
FIG. 3 is a top view of a support of the backlight module as shown in FIG. 2.

The backlight module 1 further comprises a reflector 70 and a support 80 in this embodiment. The reflector 70 is arranged under the LGP 10 for reflecting the light emitted by the LGP 10 to the LGP 10 so that most of the emitted light can enter the QD film 20. The support 80 is arranged on the base board 51 for supporting the reflector 70. The support 80 can be fabricated from metal such as aluminum (Al) for absorbing the heat generated by the reflector 70 directly and for absorbing the heat generated by the LGP 10 indirectly. Two supports 80 are used. The two supports 80 are disposed on the two opposite sides of the base board 51 with a gap. The two supports 80 correspond to the two sides of the reflector 70, respectively, for forming a space for heat radiation. As FIG. 3 shows, it is possible to use four supports 80. The four supports 80 are disposed on the four corners of the base board 51, respectively. Each of the four supports 80 corresponds to each of the four corners of the base board 51. Of course, it is also possible to use a plurality of supports 80 in another embodiment. The plurality of supports 80 are arranged on the sides of the base board 51 at intervals.

As FIG. 2 shows, the backlight module 1 further comprises a support bar 90. The support bar 90 is arranged on the sideboard 52 for fixing the light source 40. The LGP 10 comprises an emitting plane 11 and an incident plane 12. The incident plane 12 is arranged on one side of the light source 40 for absorbing the emissive light from the light source 40. It is notified that the incident plane 12 and the light source 40 form a gap for improving the ability of heat radiation of the light source 40. Light is emitted from the emitting plane 11 of the LGP 10 to the QD film 20 for exciting the QDs in the QD film 20.

Figure 4:
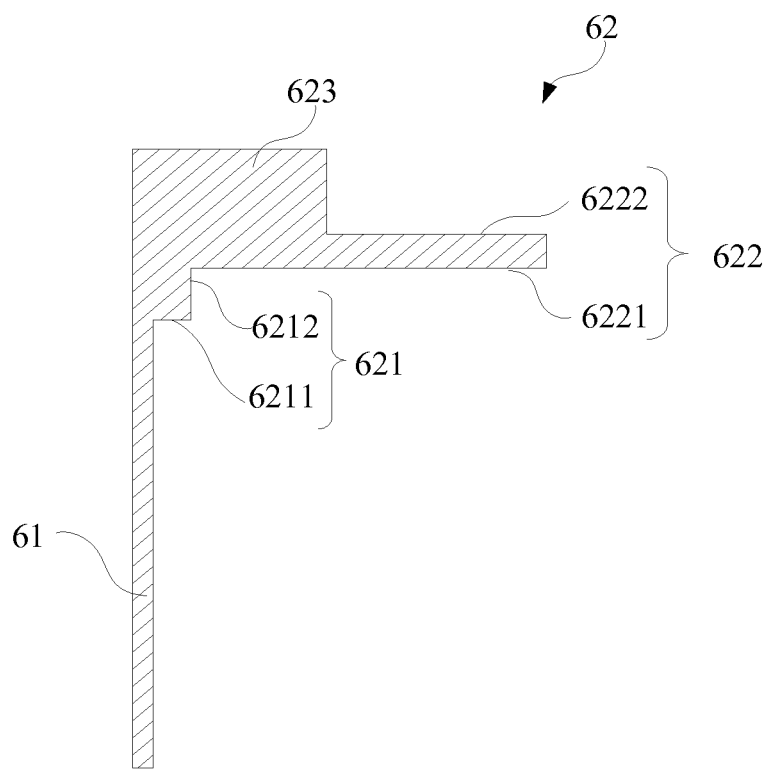
FIG. 4 is a top view of a lateral frame of a backlight module as shown in FIG. 2 according to one embodiment of the present invention.

Please refer to FIG. 4 as well. FIG. 4 is a schematic diagram of a cross section of a lateral frame 60 of a backlight module shown in FIG. 2 according to one embodiment of the present invention. A base board 51 used in this embodiment is square-shaped. A sideboard 52 extends upwards from all sides of the mother board 51. The lateral frame 60 forms a square frame. The shape of the lateral frame 60 matches the shape of the sideboard 52. The horizontal extensive object 62 comprises a first extension portion 621, a second extension portion 622, and a third extension portion 623. The bottom of the first extension portion 621 joints the top of the sideboard 52. The second extension portion 622 is arranged on the first extension portion 621. The second extension portion 622 and the top of the sideboard 52 form a slot 64 for clipping the lateral sides of the QD film 20 based on the gap of the first extension portion 621. The third extension portion 623 is arranged on the second extension portion 622. The extensive length of the third extension portion 623 is smaller than the extensive length of the second extension portion 622 so that a shape of stairs can be formed and the lateral sides of an optical film 30 can be supported.

As FIG. 2 shows, the backlight module 1 further comprises a sealed black glue 100. The sealed black glue 100 is arranged in the slot 64 and coats a lateral side of the QD film 20. The sealed black glue 100 used in the present invention is black and a water-resistant and oxygen-resistant sealed black glue for blocking off water and oxygen from entering the QD film 20 and preventing the QDs disposed on the edges of the QD film 20 from being exposed by blue light. Once the QDs disposed on the edges of the QD film 20 is excited by the light and enter the display section, the display effect will be affected.

Figure 5:
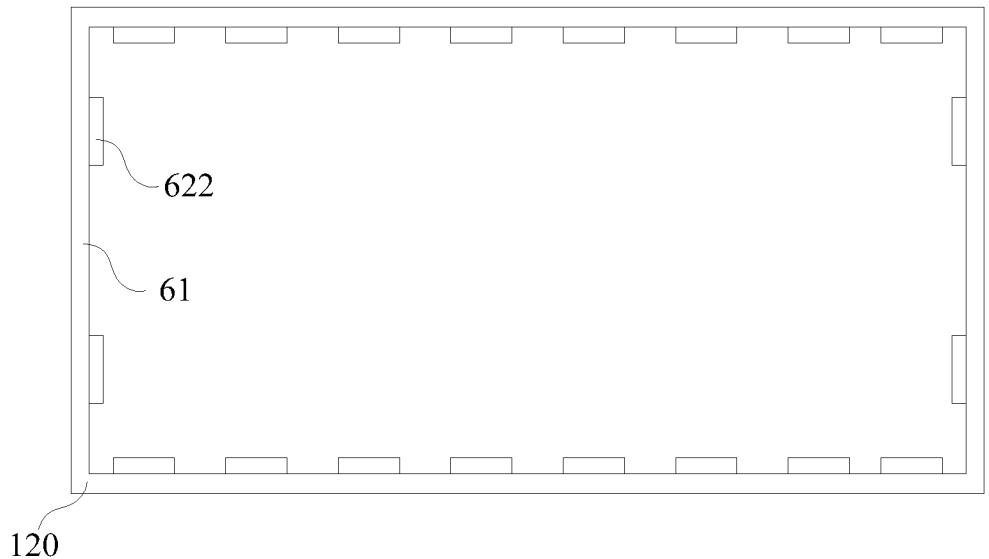
FIG. 5 is a top view of the position of the second extension portion of the lateral frame as shown in FIG. 4.

Please refer to FIG. 5 as well. FIG. 5 is a top view of the position of the second extension portion 622 of the lateral frame as shown in FIG. 4. The second extension portion 622 can be also shaped as a square frame for holding the sides of the QD film 20. Of courses, the shape of the second extension portion 622 can also be the shape shown in FIG. 5. A plurality of second extension portions 622 are used and arranged at intervals in the embodiment for holding a QD film 20 discretely. Specifically, a gap exists between any two of the adjacent second extension portions 622. The substrate of the QD film 20 is polyethylene terephthalate (PET), a water-resistant and oxygen-resistant material. The gap between any two of the adjacent second extension portions 622 gives room for the QD film 20 to expand once temperature or humidity is high. Further, the QD film 20 and the inner surface of the first extension portion 621 forms a gap so that more room can be provided for expansion of the QD film 20. The height of the gap can be the thickness of the sealed black glue 100.

Please refer to FIG. 2 and FIG. 4. The first extension portion 621 comprises a holding face 6211 and a confronting face 6212. The holding face 6211 is connected to the confronting face 6212 for forming downward stairs. The holding face 6211 holds the top of the sideboard 52. The second extension portion 622 comprises a pressing face 6221 and a supporting surface 6222. The QD film 20 presses under the pressing face 6221. The pressing face 6221 and the supporting surface 6222 are arranged in parallel with a certain distance for separating the QD film 20 and the optical film 30. The top of the sideboard 52, the holding face 6211, and the pressing face 6221 are connected successively for forming the slot 64 for fixing the lateral sides of the QD film 20. It is notified that the emitting plane 11 of the LGP 10 is as horizontal as the top of the support bar 90 and the top of the sideboard 52 for preventing the edges of the QD film 20 adhering to the LGP 10 from getting distorted. Further, the pressing face 6221 presses the QD film 20 on the LGP 10 for preventing the QD film 20 from moving. Thus, the structure of the backlight module 1 is compact and stable.

Figure 6:
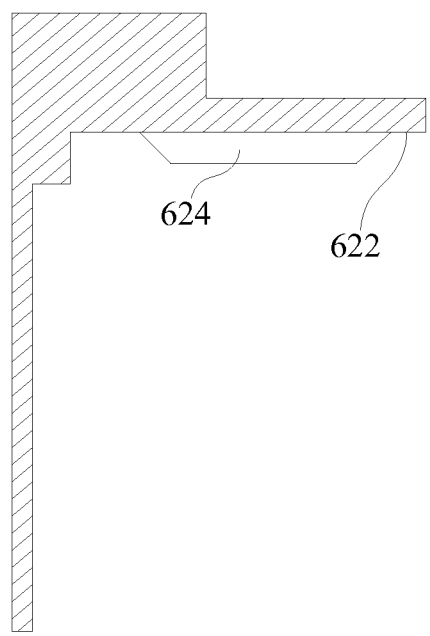
FIG. 6 is a schematic diagram of a cross section of a lateral frame of a backlight module shown in FIG. 4 according to another embodiment of the present invention.

Please refer to FIG. 6 as well. FIG. 6 is a schematic diagram of a cross section of a lateral frame 60 of a backlight module shown in FIG. 4 according to another embodiment of the present invention. The lateral frame 60 further comprises a plurality of protrusions 624 disposed on the bottom of a second extension portion 622 at intervals for holding a QD film 20 discretely. The plurality of protrusions 624 are hemisphere-like or cone-like protrusions. The plurality of protrusions 624 adhere to the second extension portion 622.

Figure 7:
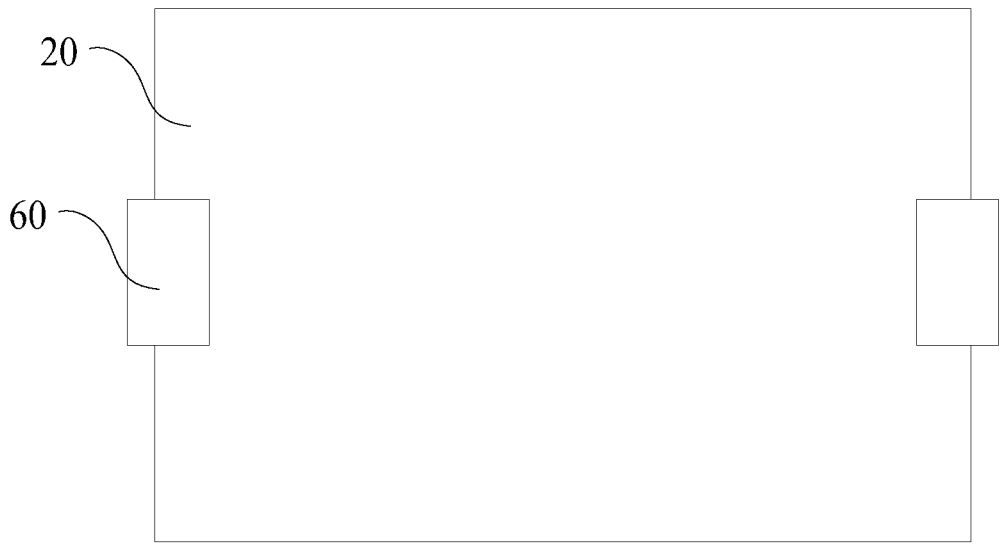
FIG. 7 is a top view of a lateral frame of a backlight module as shown in FIG. 2 according to another embodiment of the present invention.
Figure 8:
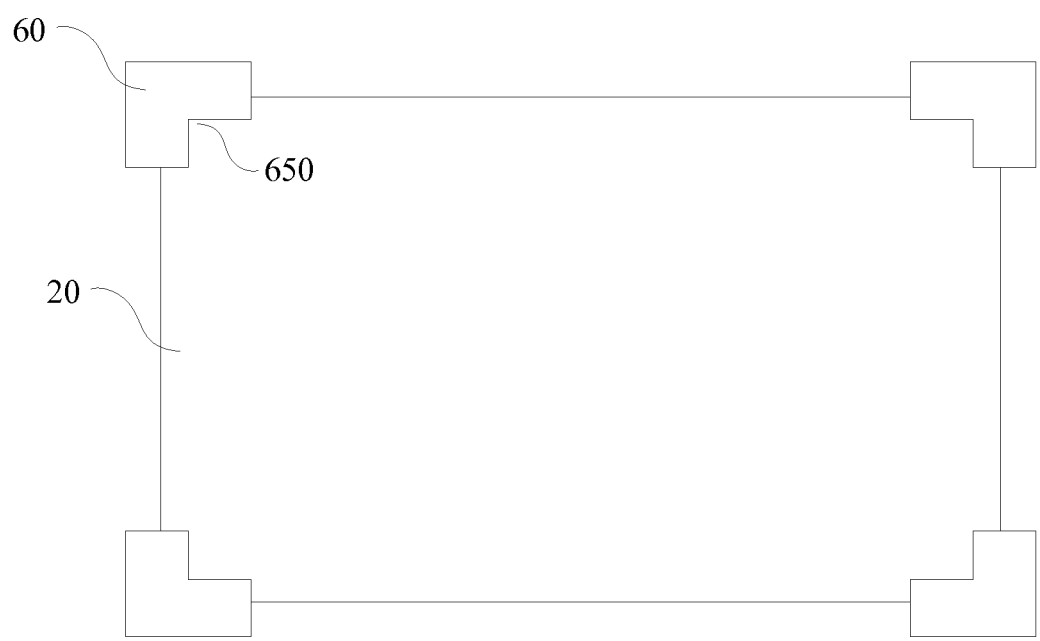
FIG. 8 is a top view of a lateral frame of a backlight module as shown in FIG. 2 according to yet another embodiment of the present invention.

Please refer to FIG. 7. FIG. 7 is a top view of a lateral frame of a backlight module 1 as shown in FIG. 2 according to another embodiment of the present invention. The backlight module 1 in this embodiment is roughly the same as that in the previous embodiment except for the way of arrangement of lateral frames in the backlight module. The lateral frame 60 in the backlight module 1 in this embodiment is shaped as a single entity rather than a square frame. Specifically, four sideboards 52 are used. The four sideboards 52 form a square frame. As FIG. 7 shows, two lateral frames 60 are used. The two lateral frames 60 presses against the top of two of the sideboards 52 facing opposite, respectively. That is, the two lateral frames 60 are used on two sides of the QD film 20 facing opposite, respectively. Of course, it is possible to use four lateral frames 60 as FIG. 8 shows. The four lateral frames 60 are arranged on the four corners of the sideboard 52, respectively. That is, each of the lateral frames 60 comprises a right-angled corner 650 which matches each of the four right angles of the sideboard 52. Also, the right-angled corners 650 match the four right angles of the QD film 20 for pressing a QD film 20.

Figure 9:
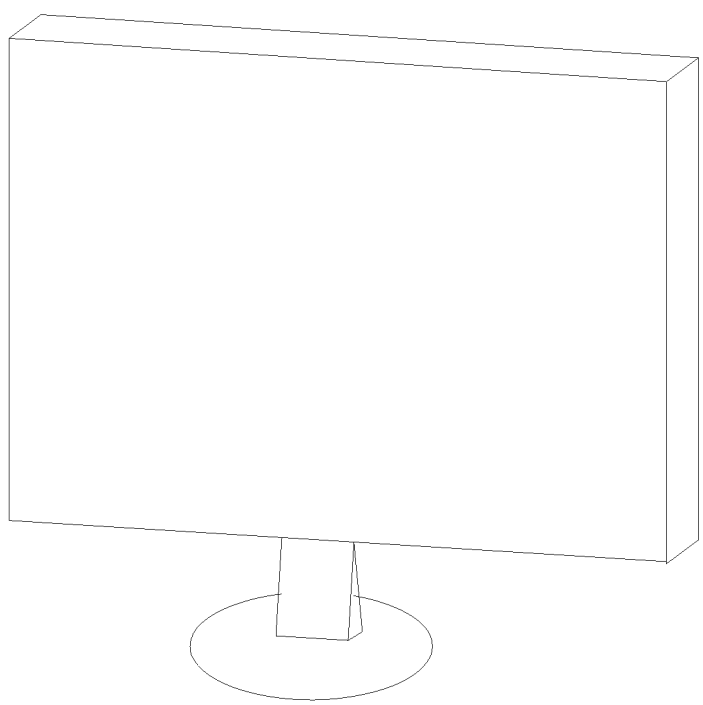
FIG. 9 shows an LCD device according to the present invention.

Please refer to FIG. 9. FIG. 9 shows the LCD device according to the present invention. The present invention further comprises an LCD device 3. The LCD device 3 comprises the above-mentioned backlight module.

The LCD device 3 and the backlight module 1 used in the LCD device 3 are proposed by the present invention. The QD film 20 is pressed on the LGP 10 with the horizontal extensive object 62. The optical film 30 and the QD film 20 are separated with the horizontal extensive object 62. So the edges of the QD film 20 does not get distorted so easily, which prevents blue circles occurring on the edges of the QD film 20. In this way, the optical performance of the backlight of the QD film 20 is improved, and the backlight module 1 realizes narrow bezel.

Relative terms, such as "first" "second", "beneath", "below", "left", "right", and the like, may be used herein for ease of description to describe one element or feature's relationship to another element(s) or feature(s) as illustrated in the figures. It will be understood that the relative terms are intended to encompass different orientations of the device in use or operation in addition to the orientation depicted in the figures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
   a light guide plate (LGP);
   a quantum dot (QD) film, adhering to the LGP;
   an optical film, arranged on the QD film;
   a light source, arranged at a lateral side of the LGP;
   a bezel, accommodating the LGP and the light source, the bezel comprising a base board and a sideboard, and the sideboard extending along a direction perpendicular to the base board;
   a lateral frame, enclosing the bezel, the lateral frame comprising a standing board and a horizontal extensive object, and the standing board adhering to an outer side of the sideboard;
   a support bar, for fixing the light source, an emitting plane of the LGP being as horizontal as a top of the support bar and a top of the sideboard for supporting the QD film;
   the horizontal extensive object comprising:
   a first extension portion, a bottom of the first extension portion jointing the top of the sideboard;
   a second extension portion, arranged on the first extension portion, and the second extension portion and the top of the sideboard forming a slot for clipping lateral sides of the QD film based on a gap of the first extension portion;
   a third extension portion, arranged on the second extension portion, an extensive length of the third extension portion being smaller than an extensive length of the second extension portion for forming a shape of stairs and for supporting a lateral side of the optical film; wherein,
   the horizontal extensive object presses the QD film on the LGP and separates the optical film from the QD film.

2. The backlight module of claim 1, wherein the first extension portion comprises:
   a holding face, holding the top of the sideboard;
   a confronting face, connected to the holding face for forming downward stairs.

3. The backlight module of claim 2, wherein the second extension portion comprises:
   a pressing face, presses the QD film;
   a supporting surface, supporting the optical film, and being arranged with the pressing face with a certain distance for separating the QD film and the optical film, wherein
   the top of the sideboard, the holding face, and the pressing face are connected successively for forming the slot for fixing the lateral sides of the QD film.

4. The backlight module of claim 1, wherein a plurality of second extension portions are used and disposed at intervals for holding the QD film discretely.

5. The backlight module of claim 1, wherein the horizontal extensive object further comprises a plurality of protrusions disposed on a bottom of the second extension portion at intervals for holding the QD film discretely.

6. The backlight module of claim 5, wherein the protrusion is a hemisphere-like or cone-like protrusion.

7. The backlight module of claim 5, wherein the protrusion adheres to the second extension portion.

8. The backlight module of claim 1, further comprising a sealed black glue coating ends of the QD film and arranged in the slot.

9. The backlight module of claim 1, wherein the bezel further comprises a support arranged on the base board for supporting the LGP.

10. The backlight module of claim 1, wherein the optical film comprises a diffusion sheet and a prism sheet layered successively.

11. A backlight module, comprising:
    a light guide plate (LGP);
    a quantum dot (QD) film, adhering to the LGP;
    an optical film, arranged on the QD film;
    a light source, arranged at a lateral side of the LGP;
    a bezel, accommodating the LGP and the light source, the bezel comprising a base board and a sideboard, and the sideboard extending along a direction perpendicular to the base board;
    a lateral frame, enclosing the bezel, the lateral frame comprising a standing board and a horizontal extensive object, and the standing board adhering to an outer side of the sideboard;
    wherein the horizontal extensive object presses the QD film on the LGP and separates the optical film from the QD film,
    wherein the horizontal extensive object comprises:
    a first extension portion, a bottom of the first extension portion jointing the top of the sideboard;
    a second extension portion, arranged on the first extension portion, and the second extension portion and the top of the sideboard forming a slot for clipping lateral sides of the QD film based on a gap of the first extension portion; and
    a third extension portion, arranged on the second extension portion, an extensive length of the third extension portion being smaller than an extensive length of the second extension portion for forming a shape of stairs and for supporting a lateral side of the optical film.

12. The backlight module of claim 11, wherein a plurality of second extension portions are used and disposed at intervals for holding the QD film discretely.

13. The backlight module of claim 11, wherein the horizontal extensive object further comprises a plurality of protrusions disposed on a bottom of the second extension portion at intervals for holding the QD film discretely.

14. The backlight module of claim 13, wherein the protrusion is a hemisphere-like or cone-like protrusion.

15. The backlight module of claim 13, wherein the protrusion adheres to the second extension portion.

16. The backlight module of claim 11, further comprising a sealed black glue coating ends of the QD film and arranged in the slot.

17. The backlight module of claim 11, wherein the bezel further comprises a support arranged on the base board for supporting the LGP.

18. The backlight module of claim 11, wherein the bezel further comprises a support bar, for fixing the light source, an emitting plane of the LGP being as horizontal as a top of the support bar and a top of the sideboard.

19. A liquid crystal display comprising the backlight module as claimed in claim 11.

* * * * *